US008547805B1

(12) United States Patent
Komura et al.

(10) Patent No.: US 8,547,805 B1
(45) Date of Patent: Oct. 1, 2013

(54) THERMALLY-ASSISTED MAGNETIC RECORDING HEAD HAVING TEMPERATURE SENSOR EMBEDDED ON DIELECTRIC WAVEGUIDE

(75) Inventors: Eiji Komura, Tokyo (JP); Koji Shimazawa, Tokyo (JP); Tsutomu Chou, Tokyo (JP); Shinji Hara, Tokyo (JP); Kosuke Tanaka, Tokyo (JP); Ryo Hosoi, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 13/432,245

(22) Filed: Mar. 28, 2012

(51) Int. Cl.
*G11B 11/00* (2006.01)
(52) U.S. Cl.
USPC ..................... 369/13.33; 369/13.13
(58) Field of Classification Search
USPC .............. 369/13, 33, 13.13, 13.32, 13.02,
369/13.17, 112.09, 112.14, 112.21, 112.27,
369/300; 360/59; 385/129, 31, 88–94;
29/603.07–603.27; 250/201.3, 201.5
See application file for complete search history.

(56) References Cited

U.S. PATENT DOCUMENTS

| 7,455,095 | B2 | 11/2008 | Yamamoto |
| 7,589,928 | B2 | 9/2009 | Roy et al. |
| 8,077,558 | B1 * | 12/2011 | Tsutsumi et al. ........... 369/13.33 |
| 8,369,191 | B2 * | 2/2013 | Shimazawa ................ 369/13.26 |
| 2010/0329085 | A1 * | 12/2010 | Kawamori et al. ........ 369/13.24 |
| 2011/0216634 | A1 * | 9/2011 | Chou et al. ................. 369/13.24 |
| 2011/0249363 | A1 | 10/2011 | Kanaya et al. |
| 2012/0051196 | A1 * | 3/2012 | Grobis et al. .............. 369/13.24 |

FOREIGN PATENT DOCUMENTS

| JP | A-08-167121 | 6/1996 |
| JP | B2-2953417 | 7/1999 |
| JP | B2-2980074 | 9/1999 |
| JP | A-2004-164797 | 6/2004 |
| JP | B2-4552983 | 7/2010 |

* cited by examiner

*Primary Examiner* — Tan X Dinh
(74) *Attorney, Agent, or Firm* — Posz Law Group, PLC

(57) ABSTRACT

A thermal assisted magnetic recording head includes a dielectric waveguide that is configured to propagate propagation light a metal waveguide that is provided facing the dielectric waveguide and that couples to the propagation light propagating through the dielectric waveguide in a surface plasmon mode, thereby generating and propagating surface plasmon, a near-field light generator that is exposed on an air bearing surface facing a magnetic recording medium either at an end part of the metal waveguide or at a position facing the end part of the metal waveguide, and that generates near-field light from the surface plasmon, a magnetic pole for magnetic recording that is exposed on the air bearing surface, and a temperature sensor that is arranged inside the dielectric waveguide.

10 Claims, 14 Drawing Sheets

THERMALLY-ASSISTED MAGNETIC RECORDING HEAD HAVING TEMPERATURE SENSOR EMBEDDED ON DIELECTRIC WAVEGUIDE

BACKGROUND OF THE INVENTION

1. Field of the Invention

The present invention relates to a thermal assisted magnetic recording head that is provided with a temperature sensor.

2. Description of the Related Art

In order to increase the recording density of magnetic recording, a recording system has been known that allows to record stably to particles with a small diameter by increasing a magnetic anisotropy constant of a magnetic recording medium and at the same time allows to record easily by heating a region to be recorded locally so as to decrease coercive force of the magnetic recording medium. A magnetic head that performs recording using the above-described recording system is referred to as a thermal assisted magnetic recording head. Near-field light is preferably used to heat when a region on the magnetic recording medium that is to be heated is smaller than a wavelength of light.

U.S. Pat. No. 7,330,404 discloses a technology that matches an oscillation frequency of light with a resonant frequency of plasmon that is generated on a metallic scatterer by irradiating light to the metallic scatterer. However, because the metallic scatterer that is a near-field light generator deforms due to excessive heating, this method is not suited for practical use. As a technology that allows to prevent such excessive heating, U.S. Pat. No. 7,855,937 and U.S. Pat. No. 8,000,178 disclose a thermal assisted magnetic recording head that uses surface plasmon polariton coupling. The technology described in the above-mentioned specifications uses surface plasmon polariton (hereinafter, occasionally referred to also as "surface plasmon") that is generated on a surface of a near-field light generator by evanescently coupling light propagating through a waveguide with the near-field light generator instead of irradiating the light directly to a plasmon antenna. The usage of the surface plasmon allows to suppress the excessive heating to the entire near-field light generator.

When heating of the magnetic recording medium is performed, the temperature of the thermal assisted magnetic recording head itself is increased. When the temperature of the thermal assisted magnetic recording head is increased, thermal expansion occurs, and a thermally-deformable air bearing surface (ABS) deforms such as to project toward the magnetic recording medium. When the thermal expansion is significant, the thermal assisted magnetic recording head may approach too much and collide to the magnetic recording medium, thereby causing damages. In order to control a flying height of the thermal assisted magnetic recording head from the magnetic recording medium such that the thermal assisted magnetic recording head does not approach too much to the magnetic recording medium due to thermal expansion, a temperature sensor made of a high resistance metal is provided in the thermal assisted magnetic recording head. The flying height of the thermal assisted magnetic recording head is controlled in correspondence with detection results of the temperature sensor, thereby preventing the collision with the magnetic recording medium.

In order to generate intense near-field light for performing high efficiency thermal assisted magnetic recording, intense coupling between the near-field light generator and propagation light is required. As a result, light penetrating into the inside of the near-field light generator that is made of a noble metal is intensified. The heat generation of the near-field light generator due to the light penetrating into the inside is not avoidable even when surface plasmon is used. For efficiently heating the magnetic recording medium and controlling the flying height of the thermal assisted magnetic recording head as described above, it is preferred to accurately determine the temperature of the thermal assisted magnetic recording head including the heat generation of the near-field light generator.

The objective of the present invention is to provide a thermal assisted magnetic recording head that accurately detects temperature with the temperature sensor and that has high heating efficiency of the magnetic recording medium by near-field light.

SUMMARY OF THE INVENTION

A thermal assisted magnetic recording head of the present invention includes a dielectric waveguide that is configured to propagate propagation light a metal waveguide that is provided facing the dielectric waveguide and that couples to the propagation light propagating through the dielectric waveguide in a surface plasmon mode, thereby generating and propagating surface plasmon, a near-field light generator that is exposed on an air bearing surface facing a magnetic recording medium either at an end part of the metal waveguide or at a position facing the end part of the metal waveguide, and that generates near-field light from the surface plasmon, a magnetic pole for magnetic recording that is exposed on the air bearing surface, and a temperature sensor that is arranged inside the dielectric waveguide.

The temperature sensor is preferably arranged at a position recessed from the air bearing surface in a direction orthogonal to the air bearing surface. In the embodiment, an end part of the temperature sensor on the air bearing surface side is covered by a dielectric body that configures the dielectric waveguide so as not to expose on the air bearing surface. Particularly, the end part of the temperature sensor on the air bearing surface side is at a position recessed at a distance of 200 nm or less from the air bearing surface in the direction orthogonal to the air bearing surface. A gap between the temperature sensor and the near-field light generator along a lamination direction of the dielectric waveguide and the metal waveguide is 200 nm or less.

With such a configuration, the temperature sensor detects heat generation of the near-field light generator with excellent sensing, so that highly accurate temperature detection is allowed to perform. Furthermore, because the temperature sensor absorbs little light when near-field light heats the magnetic recording medium, an energy loss is small and the magnetic recording medium is efficiently heated, thereby allowing to perform excellent thermal assisted magnetic recording.

The near-field light generator may be provided at a position facing a part of the metal waveguide and extends to the air bearing surface, couples to the surface plasmon propagating on the metal waveguide in a surface plasmon mode, generates secondary surface plasmon with larger wavenumber than that of the surface plasmon propagating on the metal waveguide and propagates the secondary surface plasmon toward the air bearing surface, and generates near-field light at an end part of the air bearing surface.

With such a configuration, it becomes possible to suppress performance degradation due to excessive heating of the near-field light generator, to obtain high transmission efficiency of light energy, to generate intense near-field light, and to narrow a spot size of near-field light easily.

The above described objects, features, and advantages, as well as other objects, features, and advantages of the present invention will be evident by reading the description that follows below with reference to attached drawings exemplifying examples of the present invention.

DETAILED DESCRIPTION OF THE INVENTION

A thermal assisted magnetic recording head according to embodiments of the present invention is explained with reference to the drawings.

Figure 1A:
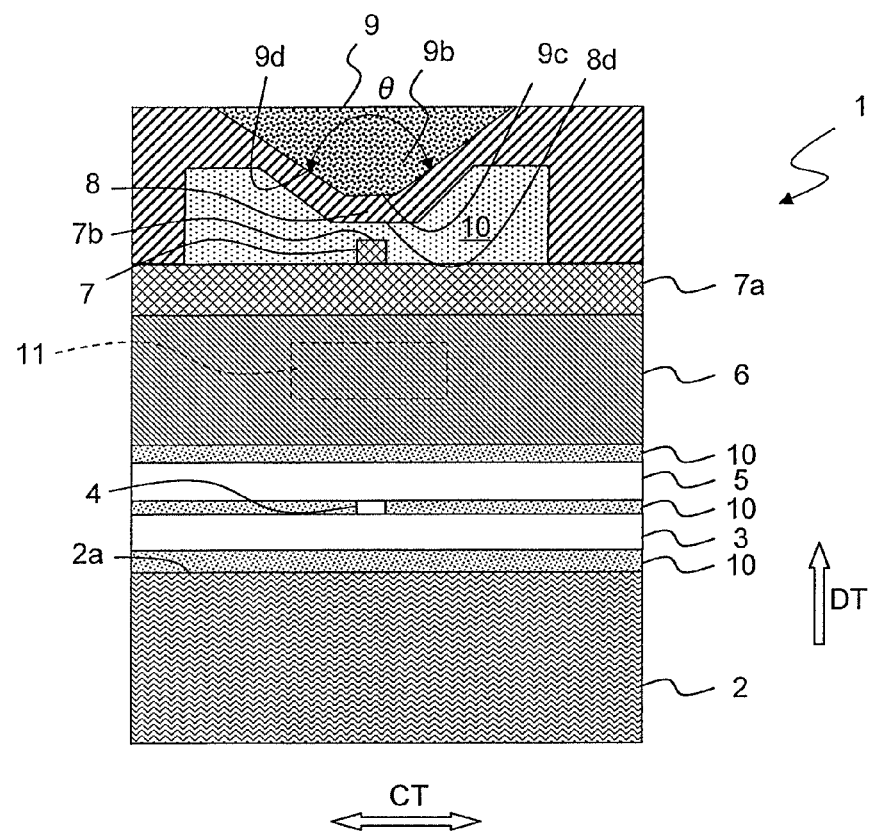
FIG. 1A is a view illustrating an air bearing surface of a thermal assisted magnetic recording head according to an embodiment of the present invention.
Figure 1B:
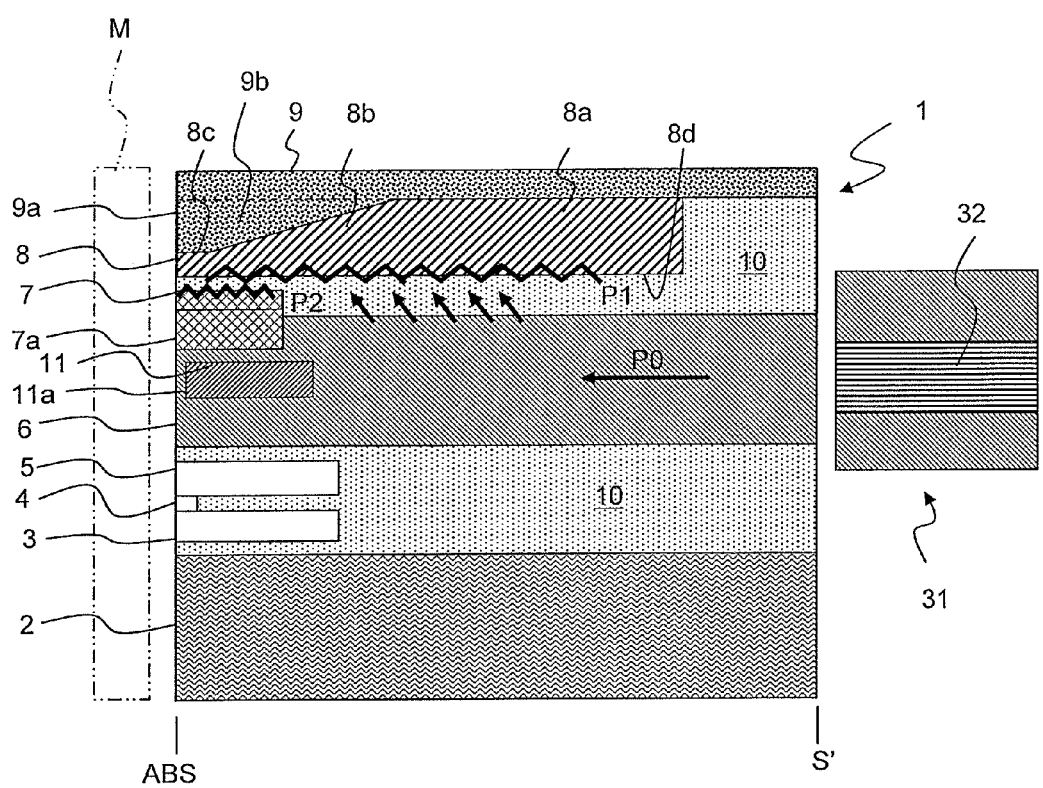
FIG. 1B is a cross sectional view of the thermal assisted magnetic recording head illustrated in FIG. 1A, the cross section cut along a direction orthogonal to the air bearing surface and a principle plane of a substrate.

FIG. 1A is a main portion schematic view illustrating an air bearing surface (ABS) of a thermal assisted magnetic recording head according to an embodiment of the present invention. FIG. 1B is a main portion schematic view of the thermal assisted magnetic recording head, the schematic view illustrating a cross section orthogonal to the ABS and a principle plane of a substrate. The ABS is a surface of the thermal assisted magnetic recording head that faces a magnetic recording medium, and the principle plane of the substrate is a plane on which the thermal assisted magnetic recording head is formed.

A thermal assisted magnetic recording head 1 (hereinafter, occasionally referred to also as "magnetic head") has a magneto resistance (MR) element 4 that is provided above a substrate 2 made of ALTIC ($Al_2O_3$—TiC). The MR element 4 has an end part exposed on the ABS and is positioned between an upper shield layer 5 and a lower shield layer 3. In the MR element 4, any arbitrary configuration using magnetoresistive effect can be utilized such as a current in plane (CIP)-giant magneto resistance (GMR) element in which a sense current flows in a direction parallel to a principle plane 2a of the substrate 2, a current perpendicular to plane (CPP)-GMR element in which a sense current flows in a direction (referred to also as a lamination direction or a recording medium traveling direction) DT perpendicular to the principle plane 2a of the substrate 2, and a tunneling magneto resistance (TMR) element using a tunnel effect. When the CPP-GMR element or the TMR element is utilized, the upper shield layer 5 and the lower shield layer 3 are also utilized as electrodes for supplying a sense current.

The magnetic head 1 has a magnetic pole 9 for perpendicular magnetic recording. The magnetic pole 9 is provided in the vicinity of a near-field light generator 7, which will be described later, and a magnetic pole tip end part 9a is positioned on the ABS. The magnetic pole 9 is formed of an alloy that is made of any two or three of Ni, Fe, and Co. A magnetic flux that is generated inside the magnetic pole 9 by a not-illustrated coil is emitted from the magnetic pole tip end part 9a toward a magnetic recording medium M, and then magnetic recording on the magnetic recording medium M is performed. The magnetic pole 9 has a projection part 9b that is projected toward the near-field light generator 7 in the position facing the near-field light generator 7. The projection part 9b is a part of the magnetic pole 9 and emits a magnetic flux toward the magnetic recording medium M. Therefore, a magnetic flux is emitted in the vicinity of the near-field light generator 7, which will be described later, thereby enabling efficient thermal assisted magnetic recording.

A laser diode 31 is provided adjacent to the magnetic head 1. The laser diode 31 is an edge emitting type, and a laser diode of InP-system, GaAs-system, GaN-system and the like that are normally used for communication, optical system disk storages, or material analysis is usable. The wavelength of laser light to be radiated is not limited in particular; however, the wavelength in the range of 375 nm-1.7 μm can be used, and the wavelength of approximately 800 nm is preferably used in particular. An active layer 32 of the laser diode 31, in which laser light continuously oscillates, emits laser light toward a dielectric waveguide 6 of the magnetic head 1, the dielectric waveguide 6 being positioned facing the active layer 32.

Figure 2:
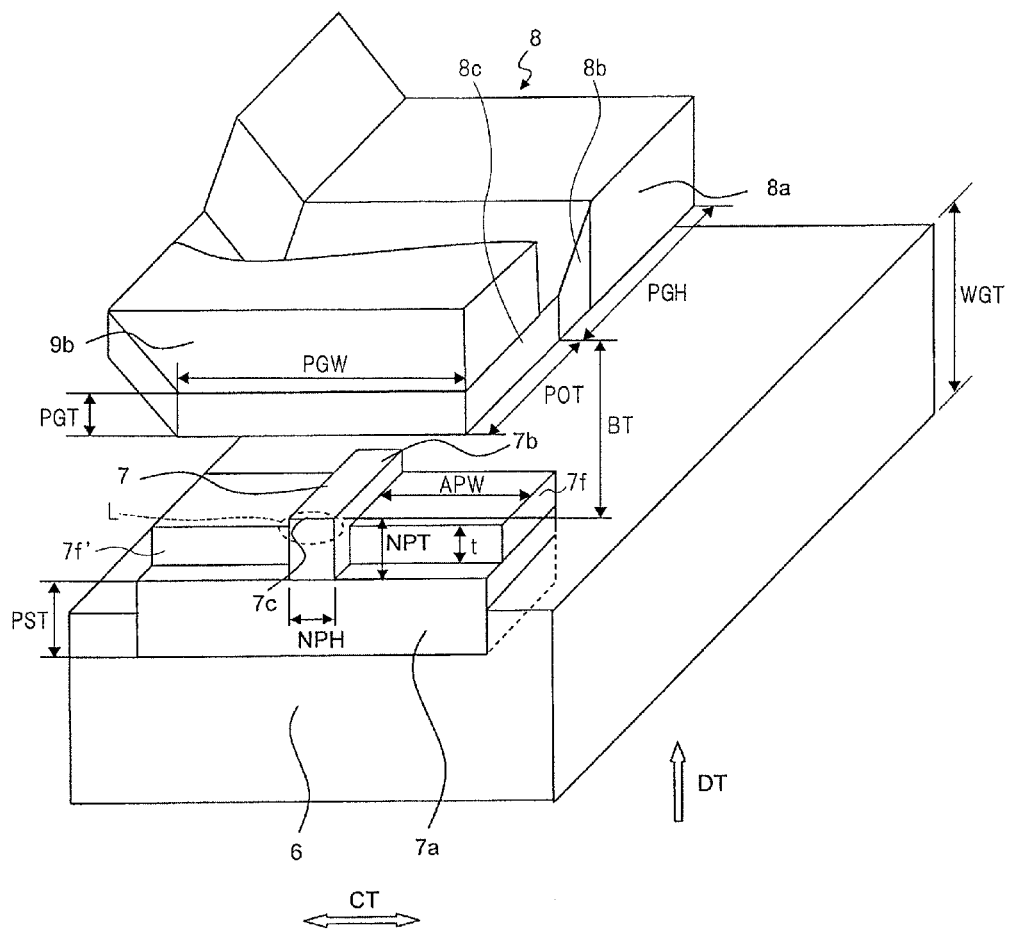
FIG. 2 is a perspective view of a dielectric waveguide, a near-field generator, a metal waveguide, and a magnetic pole of the thermal assisted magnetic recording head illustrated in FIGS. 1A and 1B.

The magnetic head 1 is provided with the dielectric waveguide 6 that can propagate laser light as propagation light P0, a metal waveguide 8 that couples to the propagation light P0 propagating through the dielectric waveguide 6 in a surface plasmon mode to generate and propagate first surface plasmon P1, and a near-field light generator 7 that couples to the first surface plasmon P1 propagating on the metal waveguide 8 in a surface plasmon mode to generate and propagate second surface plasmon (secondary surface plasmon) P2 and that generates near-field light. FIG. 2 is a perspective view illustrating the dielectric waveguide 6, the near-field light generator 7, the metal waveguide 8, and the magnetic pole 9, which are in the vicinity of the ABS.

Inside the dielectric waveguide 6, a temperature sensor 11 made of a high resistance metal layer is provided. The temperature sensor 11 is connected with an external electric circuit via a conductive pattern that is formed integrally with the temperature sensor 11 or a connecting path such as a via that penetrates through layers and extends, the conductive pattern and the connecting path being not illustrated. Then, an electric resistance value of the high resistance metal that configures the temperature sensor 11 is measured and then a temperature is obtained from the electric resistance value. The amount of heat expansion of the magnetic head 1 is obtained by the temperature that is obtained as described above; and the gap (flying height of the magnetic head 1 from the magnetic recording medium) between the magnetic head 1 and the magnetic recording medium is obtained by obtaining the deference with the flying height in the case of no heat expansion. Thereby, it becomes possible to perform a control of a flying height such that the magnetic head 1 does not approach to the magnetic recording medium too much.

Figure 1C:
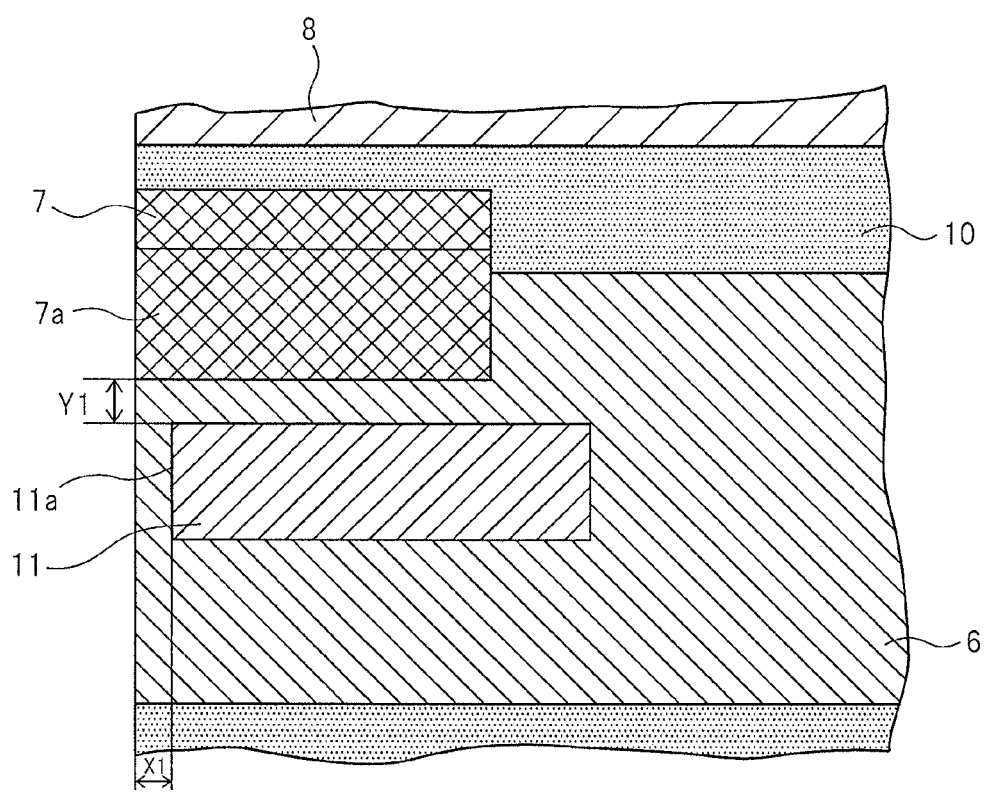
FIG. 1C is a main portion enlarged view of FIG. 1B.

The temperature sensor 11 is not exposed on the ABS, and is at a position where an end part 11a on the ABS side is recessed from the ABS. The end part 11a on the ABS side is not exposed on the ABS because the end part 11a is covered by a dielectric body that configures the dielectric waveguide 6. The temperature sensor 11 contacts neither the near-field light generator 7 nor an insulating layer 10, and is positioned inside the dielectric waveguide 6. In the present embodiment, a recession distance X from the ABS to the end part 11a of the temperature sensor 11 is 200 nm or less; and a gap Y1 between the near-field light generator 7 and the temperature sensor 11 from the perspective of the lamination direction along the ABS is 200 nm or less (see FIG. 1C). Note, referring to FIG. 1C, strictly speaking, the gap Y1 is the gap between a first heat dissipation layer 7a and the temperature sensor 11; however, because in the present embodiment the near-field light generator 7 and the first heat dissipation layer 7a are integrally formed of the same material as will be described later, it is possible to consider the first heat dissipation layer 7a as substantially a part of the near-field light generator 7. Therefore, it is possible to consider the gap Y1 as a gap between the near-field light generator 7 and the temperature sensor 11. The position of the temperature sensor 11 will be described later.

Because the configuration is as described above, in the present embodiment, laser light from the active layer 32 of the laser diode 31 enters the dielectric waveguide 6 and propagates as propagation light P0. The metal waveguide 8 couples to the propagation light P0 in the surface plasmon mode, thereby generating and propagating first surface plasmon P1. Furthermore, the near-field light generator 7 couples to the first surface plasmon P1 in the surface plasmon mode, thereby generating and propagating second surface plasmon (secondary surface plasmon) P2. The near-field light generator 7 generates near-field light on the ABS from the second surface plasmon that has propagated, and the near-field light is irradiated toward the magnetic recording medium M. While the magnetic recording medium M is partially heated by the irradiation of the near-field light to decrease coercive force, a magnetic flux that is generated by a not-illustrated coil emits from the magnetic pole tip end part 9a toward the magnetic recording medium M, and then magnetic recording to the magnetic recording medium M is performed. At this time, the temperature sensor 11 made of the high resistance metal layer detects temperature.

As described above, the temperature sensor 11 according to the present embodiment is not exposed on the ABS and is at the position recessed from the ABS. The description about this will be given. During reading, the magnetic recording medium M rotates at high speed and the magnetic head 1 gets close to the magnetic recording medium M, and then a gap between the magnetic head 1 and the magnetic recording medium M becomes a few nanometers. Therefore, air flow caused by the rotation of the magnetic recording medium M affects the magnetic head 1 with air-cooling effect. When the end part 11a of the temperature sensor 11 on the ABS side is exposed on the ABS, the temperature sensor 11 is cooled by the air flow so that the temperature detected by the temperature sensor 11 may be lowered to a lower value. In other words, even when the temperature inside the magnetic head 1 is high, a detection result of the temperature sensor 11 that is exposed on the ABS indicates a lower value because the high temperature inside the magnetic head 1 is not reflected, and at the result the reliability of the temperature sensor 11 may be lowered. On the other hand, in the present embodiment, the end part 11a of the temperature sensor 11 is at the position recessed from the ABS, is covered by a dielectric body, and is not exposed, so that an appropriate detection result to which the high temperature inside the magnetic head 1 is reflected is obtained without receiving the effect of the air flow due to the rotation of the magnetic recording medium M.

Also, when the temperature sensor 11 is provided separately from the optical elements such as the dielectric waveguide 6, the near-field light generator 7, and the metal waveguide 8, the temperature sensor 11 is positioned at a distance from the near-field light generator 7 of which heat generation should extremely be detected. Therefore, it is impossible to detect heat generation of the near-field light generator 7 very well. However, in the present invention, because the temperature sensor 11 is arranged inside the dielectric waveguide 6 that is provided near the near-field light generator 7, it is possible to detect heat generation of the near-field light generator 7 with excellent sensing.

On the other hand, when the temperature sensor 11 contacts the near-field light generator 7 or is close too much to the near-field light generator 7, light that is supposed to irradiate toward the magnetic recording medium M may be absorbed by the high resistance metal configuring the temperature sensor 11. In that case, even when laser light with the same intensity is supplied to the magnetic head 1, energy that is used to heat the magnetic recording medium M is decreased (the energy loss is increased), thereby not allowing to perform excellent thermal assisted magnetic recording efficiently. Also, the high resistance metal itself generates heat, which is not ignorable. On the other hand, in the present embodiment, because the temperature sensor 11 is positioned inside the dielectric waveguide 6, the temperature sensor 11 doesn't contact the near-field light generator 7 or does not get close too much to the near-field light generator 7, and therefore a light absorption amount is small. As a result, it becomes possible to heat the magnetic recording medium M efficiently and to perform excellent thermal assisted magnetic recording.

The following table indicates the results whether highly accurate temperature detection is possible or not when the position of the temperature sensor 11 is changed, the results being experimentally obtained. In the following table, indicated are a distance X1 that is a recessed distance of the temperature sensor 11 from the ABS in the direction (X direction) orthogonal to the ABS with respect to the ABS as a reference (O), and a distance Y1 that is a distance from the near-field light generator 7 to the temperature sensor 11 with respect to an end part of the near-field light generator 7 (more particularly, the first heat dissipation layer 7a) on the dielectric waveguide 6 side as a reference (0) from the perspective of a lamination direction DT (also, referred to as a Y direction) along the ABS (see FIG. 1C). Note, the length of the temperature sensor 11 according to the present embodiment in the X direction is 200 nm; the length of the temperature sensor 11 according to the present embodiment in the Y direction is 50 nm. The sizes of the dielectric waveguide 6, the metal waveguide 8, and the near-field light generator 7 illustrated in FIG. 2 are as follows: WGT=400 nm, BT=60 nm, POT=30 nm, PGH=1400 nm, PGT=10 nm, APW=100 nm, NPH=20 nm, t=25 nm, PST=80 nm, and PGW=100 nm. The dielectric waveguide 6 configuring the core is made of $TaO_x$ (refractive index n=2.08), and the insulating layer 10 configuring the cladding is made of $SiO_2$ (refractive index n=1.672).

|   | | X1 (nm) | | | | | | | |
|---|---|---|---|---|---|---|---|---|---|
|   |   | 0 | 10 | 50 | 100 | 150 | 200 | 250 | 300 |
| Y1 (nm) | 0 | NG | NG | NG | NG | NG | NG | NG | NG |
|   | 10 | NG | OK | OK | OK | OK | OK | OK | NG |
|   | 50 | NG | OK | OK | OK | OK | OK | OK | NG |
|   | 100 | NG | OK | OK | OK | OK | OK | OK | NG |
|   | 150 | NG | OK | OK | OK | OK | OK | OK | NG |
|   | 200 | NG | OK | OK | OK | OK | OK | NG | NG |
|   | 250 | NG | OK | OK | OK | OK | NG | NG | NG |
|   | 300 | NG | NG | NG | NG | NG | NG | NG | NG |
|   | 350 | NG | NG | NG | NG | NG | NG | NG | NG |

From the above-described table, it is confirmed that excellent temperature detection can be performed when 0 nm<X1≤200 nm and 0 nm<Y1≤200 nm. Also, the temperature sensor 11 is provided in a region that faces a portion of the metal waveguide 8 that is positioned the closest to the ABS side when the metal waveguide 8 is divided into three portions from the perspective of a light propagating direction (X direction). Note, the length of the metal waveguide 8 in the X direction is, for example, approximately 1000 nm-1600 nm.

As a high resistance metal for configuring the temperature sensor 11, NiFe, Ni, Ti, and the like are usable. The characteristics of these metals are indicated in the following table. Also, FIG. 3 indicates the resistance value variation that corresponds to the temperature variation. The vertical axis of FIG. 3 indicates values that are standardized using the resistance value when each of the metals is at 20° C. as 1.0. With such a configuration, the larger the variation amount of the resistance value during temperature increase of the temperature sensor 11 is, the more it becomes preferable, because sensitivity to temperature becomes high.

| Material | Resistivity (μΩcm) | Standardized Value of Resistance Value during Temperature Increase (200° C.) | Temperature Coefficient (ppm/K) |
|---|---|---|---|
| NiFe | 24.0 | 1.75 | 9722 |
| Ni | 20.0 or less | 1.60 | 6400 |
| Ti | 79.0 | 1.53 | 5400 |
| Au | 3.7 | 1.30 | 3400 |
| W | 20.0 | 1.30 | 4800 |

Figure 3:
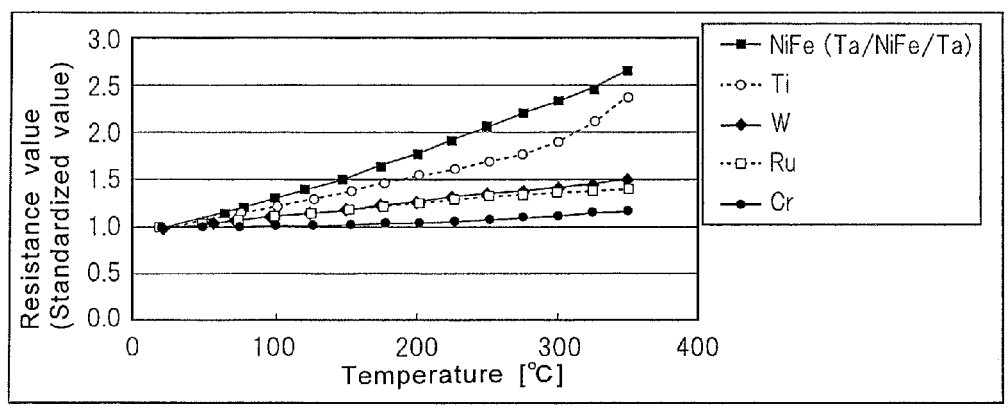
FIG. 3 is a graph illustrating the relationship between the temperature variation and the resistance value variation of the thermal assisted magnetic recording head of the present invention.

As is obvious from the above-described table and FIG. 3, it is preferred to form the temperature sensor 11 of NiFe, Ni, or Ti because the variation amount of the resistance value during temperature increase is large. However, the configurations, which are described as comparative examples, in which Au, W, Ru, or Cr is used as a material of the temperature sensor 11 is not preferable because the variation amount of the resistance value during the temperature increase is small.

Next, referring to FIGS. 1A, 1B, and 2, detail descriptions regarding optical elements of the magnetic head 1 are given. In FIGS. 1A and 1B, the dielectric waveguide 6, the near-field light generator 7, the metal waveguide 8, and the magnetic pole 9 are laminated in this order in the recording medium traveling direction DT; however, these may also be laminated in a reverse order.

<Dielectric Waveguide 6>

The dielectric waveguide 6 is an optical member that linearly extends inside the thermal assisted magnetic recording head 1 and has a substantially rectangular cross section. In the present embodiment, the dielectric waveguide 6 extends from a surface S' that faces the laser diode 31 to the ABS; however, the dielectric waveguide 6 may end before the ABS. The dielectric waveguide 6 has a refractive index that is higher than that of the insulating layer 10 that is around the dielectric waveguide 6. When light completely reflects off an interface between the dielectric waveguide 6 and the insulating layer 10, laser light entering from the laser diode 31 propagates through the inside of the dielectric waveguide 6 as propagation light P0. The dielectric waveguide 6 configure a core of the waveguide system, and the insulating layer 10 configures a cladding of the waveguide system. When the wavelength of laser light is 600 nm, the cladding (insulating layer 10) may be formed of, for example, $SiO_2$, and the core (dielectric waveguide 6) may be formed of, for example, $Al_2O_3$. When the cladding is formed of $Al_2O_3$, the core may be formed of, for example, tantalum oxide ($TaO_x$). When the wavelength of laser light is 800 nm, the cladding may be formed of, for example, $Al_2O_3$, and the core may be formed of, for example, $TaO_x$. Herein, $TaO_x$ means tantalum oxide with arbitrary composition, which is typically $Ta_2O_5$, $TaO$, $TaO_2$, and the like; however, is not limited to these.

<Metal Waveguide 8>

The metal waveguide 8 is a metal layer of noble metal that is positioned facing the dielectric waveguide 6 with the insulating layer 10 therebetween. The metal waveguide 8 is formed of a metal mainly composed of gold, silver, copper, aluminum, or platinum, or an alloy composed of these. The metal waveguide 8 can evanescently couple to the propagation light P0 propagating through the dielectric waveguide 6, generate surface plasmon (first surface plasmon) P1 with larger wavenumber than that of the propagation light P0, and propagate the first surface plasmon P1. The first surface plasmon P1 propagating on the metal waveguide 8 evanescently couples to the near-field light generator 7, thereby generating secondary surface plasmon (second surface plasmon) P2 on the near-field light generator 7. The metal waveguide 8 is provided on at least a tip end surface 9c of the projection part 9b of the magnetic pole 9, the tip end surface 9c facing the near-field light generator 7.

The metal waveguide 8 is configured with a portion 8a with a constant thickness positioned on the opposite surface S' side of the ABS, a portion 8b with a thickness continuously reducing as approaching the ABS, and a portion 8c with a constant thickness positioned on the ABS side, the thickness being smaller than that of the portion 8a. By thinning the metal waveguide 8 as described above as the metal waveguide 8 approaches the ABS, the projection part 9b of the magnetic pole 9 can be formed. Evanescent coupling of the dielectric waveguide 6 and the metal waveguide 8 occurs mainly on the portions 8a and 8b. Evanescent coupling of the near-field light generator 7 and the metal waveguide 8 preferably occurs mainly on the portion 8b such that the first surface plasmon P1 generated on the metal waveguide 8 does not heat the magnetic pole tip end part 9a.

The metal waveguide 8 has a facing surface 8d that faces the dielectric waveguide 6 and the near-field light generator 7. Evanescent coupling of the dielectric waveguide 6 and the near-field light generator 7 occurs on the facing surface 8d. The facing surface 8d extends from the ABS toward the opposite surface S'. The facing surface 8d has an almost flattened shape as illustrated in FIG. 1A, so the first surface plasmon P1 is generated in a relatively large area from the perspective of the cross section perpendicular to the propagation direction of the propagation light P0. The wavenumber of the first surface plasmon P1 is not significantly different from the wavenumber of the propagation light P0 propagating through the dielectric waveguide 6. Therefore, the coupling efficiency of evanescent coupling is high and light energy can be efficiently transmitted to the metal waveguide 8. On the other hand, because the wavenumber of the first surface plasmon P1 is larger than that of the propagation light P0 and the light spot size is narrowed, evanescent coupling with the near-field light generator 7 is performed with high efficiency.

The metal waveguide 8 is formed on a side surface 9d of the projection part 9b of the magnetic pole 9 to enhance heat dissipation. Light penetrates into the metal waveguide 8 when the metal waveguide 8 evanescently couples to the propagation light P0 propagating through the dielectric waveguide 6, and thereby the metal waveguide 8 is heated. By covering almost entire surfaces of the projection part 9b of the magnetic pole 9 with the metal waveguide 8, heat generated in the metal waveguide 8 can efficiently be released to the magnetic pole 9.

<Near-Field Light Generator 7>

The near-field light generator 7 is a bar-shaped member of noble metal positioned facing an end part of the metal waveguide 8. The near-field light generator 7 extends in the insulating layer 10 to the ABS. The near-field light generator 7 is formed of a metal mainly composed of gold, silver, copper, aluminum, or platinum, or an alloy of these. The near-field light generator 7 evanescently couples to the first surface plasmon P1 propagating on the metal waveguide 8 and generates the second surface plasmon P2 with larger wavenumber than that of the first surface plasmon P1 propagating on the metal waveguide 8. The second surface plasmon P2 is generated at an frame part 7b facing the metal waveguide 8 of the near-field light generator 7 and propagates to an edge part 7c on the ABS side along the frame part 7b, thereby generating near-field light L at the edge part 7c on the ABS side. Because a width NPH of the near-field light generator 7 in the track width direction CT on the ABS defines the width of light spot of near-field light, it is preferred to make the width NPH sufficiently small and is preferred to set at, for example, 45 nm or less. On the other hand, a thickness NPT in the recording medium traveling direction DT of the near-field light generator 7 on the ABS is preferably set at, for example, not less than 10 nm but not more than 60 nm because the edge part 7c of the near-field light generator 7 is preferred to be distanced at a certain distance from a noble metal layer near the edge part 7c, which is specifically the first heat dissipation layer 7a, which will be described later.

As illustrated in FIGS. 1A and 2, the shape of a cross section of the near-field light generator 7 is a rectangle with one side facing the magnetic pole 9, the cross section parallel to the ABS; however, although not illustrated, the shape may also be a trapezoid with a short side facing the magnetic pole 9, the short side being the one out of parallel two sides, or may also be a triangle with one apex facing the magnetic pole 9. Furthermore, the near-field light generator 7 may have a shape whose cross section is narrowed as going toward the ABS. By having such a shape, light energy is intensified at a tip end part of the near-field light generator 7 and thereby light intensity is increased. Also, because heat dissipation is improved, a M/H ratio (ratio of a maximum temperature of the magnetic recording medium M to a maximum temperature of the recording head 1) is increased and thereby the reliability of the magnetic head is increased.

<First and Second Heat Dissipation Layers>

In order to increase the heat dissipation of the near-field light generator 7, a first heat dissipation layer 7a is provided on the lower side of the near-field light generator 7 from the perspective of the magnetic pole 9 in the manner of contacting the near-field light generator 7. The first heat dissipation layer 7a has a larger size in the track width direction CT than that of the near-field light generator 7, and is partially embedded in the dielectric waveguide 6. The first heat dissipation layer 7a is made of a metal mainly composed of gold, silver, copper, aluminum, or platinum, or an alloy composed of these. Upon a manufacturing process, the first heat dissipation layer 7a is preferably made of the material the same as that of the near-field light generator 7 and formed in an integrated manner to the near-field light generator 7.

Although not illustrated, the first heat dissipation layer 7a may have cavity parts that open toward the ABS on both sides of the near-field light generator 7 in the track width direction CT. By providing these cavity parts, a thermal spot on the magnetic recording medium can be narrowed in the track width direction CT. It is also possible to provide the cavity part on only either one side.

In order to increase the heat dissipation, the first heat dissipation layer 7a may be linked to the metal waveguide 8 as illustrated in FIG. 1A; however, although not illustrated, the first heat dissipation layer 7a may also be separated from the metal waveguide 8 at least on the ABS. With such a structure in which the first heat dissipation layer 7a and the metal waveguide 8 are separated, because no metal element exists on the lateral sides of the near-field light generator 7, surface plasmon is effectively trapped in the near-field light generator 7 and a thermal spot on the magnetic recording medium M can be narrowed in the track width direction CT.

In order to further increase the heat dissipation, as illustrated in FIG. 2, on the first heat dissipation layer 7a and on both lateral sides of the near-field light generator 7 in the track width direction CT, second heat dissipation layers 7f and 7f' are provided in the manner of contacting the first heat dissipation layer 7a and the near-field light generator 7. The second heat dissipation layers 7f and 7f' are made of a metal mainly composed of gold, silver, copper, aluminum, or platinum, or an alloy of these; upon the manufacturing process, the second heat dissipation layers 7f and 7f' are preferably made of the material the same as that of the first heat dissipation layer 7a and the near-field light generator 7 and formed in an integrated manner to the first dissipation layer 7a and the near-field light generator 7. It is also possible to provide one of the second heat dissipation layers 7f and 7f' on only one side of the lateral sides of the near-field light generator 7 in the track width direction CT.

The second heat dissipation layers 7f and 7f' are formed in positions distanced from the ABS, in other words, in positions recessed from the ABS in the direction orthogonal to the ABS. Thereby, the tip edge part 7c of the near-field light generator 7 is prevented from contacting the second heat dissipation layers 7f and 7f' on the ABS, and near-field light L is certainly formed at the tip edge part 7c of the near-field light generator 7.

The second heat dissipation layers 7f and 7f' may have a constant film thickness t smaller than the thickness of the near-field light generator 7 as illustrated in FIG. 2; however, although not illustrated, the second heat dissipation layers 7f and 7f' may also have a film thickness that increases as approaching to the near-field light generator 7. This increases an area where the second heat dissipation layers 7f and 7f' and the near-field light generator 7 contact each other, and thereby the heat dissipation can be increased. In that case, at the position where the second heat dissipation layers 7f and 7f' contact the near-field light generator 7, the upper surface of the near-field light generator 7 may either match the upper surfaces of the second heat dissipation layers 7f and 7f' or be positioned on the downstream side of the medium traveling direction DT with respect to the upper surfaces of the second heat dissipation layers 7f and 7f'.

In the present embodiment, light energy of laser light that has entered from the laser diode 31 into the dielectric waveguide 6 is transmitted to the metal waveguide 8 when the dielectric waveguide 6 and the metal waveguide 8 couple to each other in the surface plasmon mode; further, the light energy is transmitted to the near-field light generator 7 when the metal waveguide 8 and the near-field light generator 7 couple to each other in the surface plasmon mode. When light energy is transmitted at such two stages, the wavenumber of propagation light increases after each transmission. Thereby, it becomes possible to narrow light spot as increasing the wavenumber at each stage by each energy transmission, and as a result, a significant mismatch of the wavenumbers is prevented and the transmission efficiency of light energy is increased.

In the present embodiment, there is also an advantage that the angle θ of the projection part 9b of the magnetic pole 9 can be set large. In other words, in order to narrow light spot, it is effective to set the angle θ of the projection part 9b smaller so that the angle of the tip end part of the metal waveguide 8 is made smaller; however, in such instance, it becomes difficult to increase the cross sectional area of the projection part 9b so that sufficient magnetic field intensity cannot be secured. On the other hand, because in the present embodiment light spot is narrowed at the two stages, the necessity of making the angle θ of the tip end part of the metal waveguide 8 smaller is small. Therefore, it is easy to increase the cross sectional area of the projection part 9b and to secure the magnetic field intensity.

Also, excessive energy is not input to the near-field light generator 7 because light energy is sequentially transmitted by two-time evanescent coupling, and the first and second heat dissipation layers 7a, 7f and 7f' are provided; thereby, appropriate heat dissipation of the near-field light generator 7 can be secured. Also regarding the metal waveguide 8, the projection part 9b of the magnetic pole 9 functions as a heat dissipation layer, and thereby the heat dissipation can be secured.

With such configuration, because light energy is transmitted using surface plasmon with large spot size and small loss, heating of the entirety of the near-field light generator 7 is suppressed, and thereby it becomes easy to suppress the performance degradation due to excessive heating. Light energy is transmitted at the two stages between the dielectric waveguide 6 and the metal waveguide 8 and between the metal waveguide 8 and the near-field light generator 7. The wavenumber is increased at each of the stages, so that a significant mismatch of the wavenumbers is prevented and also it becomes possible to increase transmission efficiency of light energy, in other words, coupling efficiency at each of the stages. Therefore, compared to only-one-time energy transmission between the dielectric waveguide 6 and the near-field light generator 7, the transmission efficiency of light energy is increased and further intense near-field light can be generated. Similarly, because the wavenumber is increased at the two stages, it is also easy to narrow the spot size of near-field light.

(Main Parts of Manufacturing Process)

Next, referring to FIGS. 4A-4N, description of a manufacturing process of the thermal assisted magnetic recording head described above will be given focusing especially on the dielectric waveguide 6, the near-field light generator 7, the first and second heat dissipation layers 7a, 7f and 7f', the metal waveguide 8, and the magnetic pole 9.

Figure 4A:
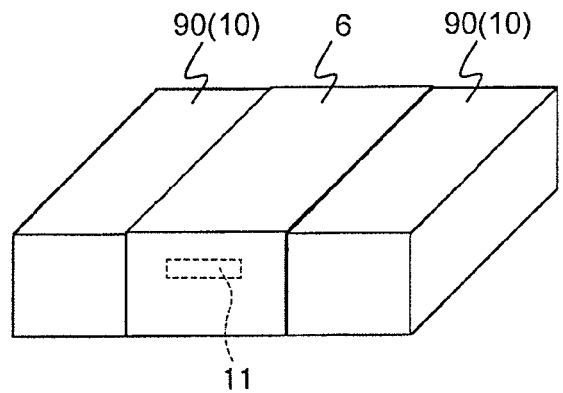
FIGS. 4A-4N are perspective views illustrating a manufacturing process of the thermal assisted magnetic recording head of the present invention.

At first, as illustrated in FIG. 4A, a TaO$_x$ layer that eventually becomes the dielectric waveguide 6, a high resistance metal layer with an appropriate size that eventually becomes the temperature sensor 11, and a TaO$_x$ layer are sequentially laminated and formed by a sputtering and the like. Then, a resist is coated on a portion that eventually becomes the dielectric waveguide 6, the TaO$_x$ layer is milled to be a long and narrow shape, and the dielectric waveguide 6 made of TaO$_x$ and the temperature sensor 11 positioned inside the dielectric waveguide 6 are formed. Then, on both lateral sides of the dielectric waveguide 6, SiO$_2$ layers 90 that eventually become the cladding (insulating layer 10) of the dielectric waveguide 6 are formed, and upper surfaces of the TaO$_x$ layer 6 and the SiO$_2$ layers 90 are planarized by chemical mechanical polishing (CMP).

Figure 4B:
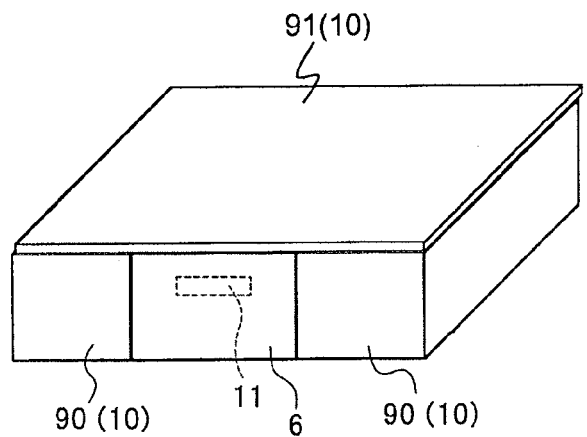
Figure 4C:
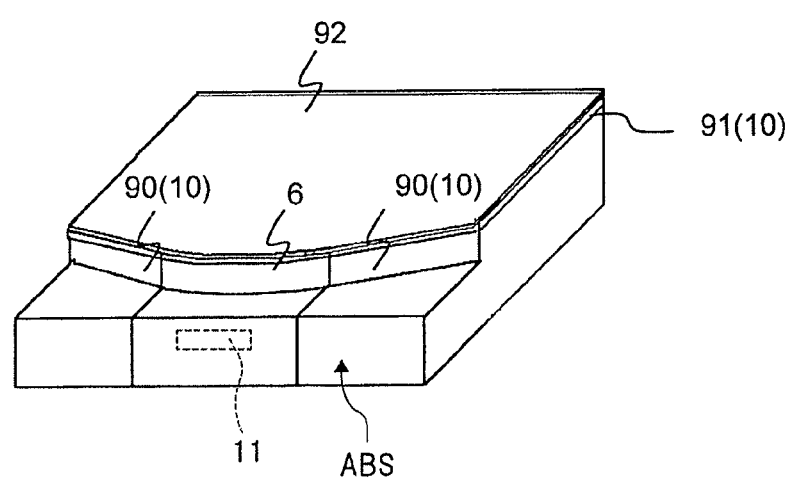
Figure 4D:
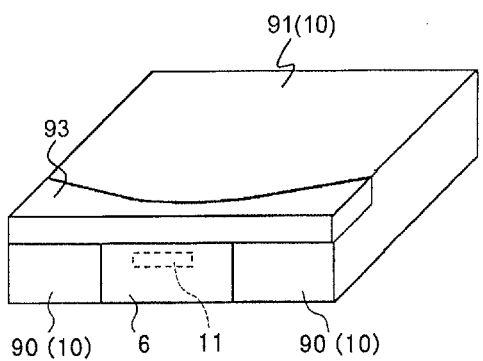

Next, as illustrated in FIG. 4B, a SiO$_2$ layer 91 that eventually becomes the cladding (insulating layer 10) is formed on the upper surfaces of the SiO$_2$ layers 90 and the TaO$_x$ layer 6 that incorporates the temperature sensor (high resistance metal) 11, the SiO$_2$ layer 91 separating a region of the dielectric waveguide 6 and the near-field light generator 7 and a region of the metal waveguide 8. As illustrated in FIG. 4C, a metal resist 92 is formed, and a certain region of the SiO$_2$ layer 91, the TaO$_x$ layer 6, and the SiO$_2$ layer 90 from the perspective of a direction orthogonal to the ABS is removed by milling, the TaO$_x$ layer 6 and the SiO$_2$ layer 90 being provided underneath the SiO$_2$ layer 91. Next, as illustrated in FIG. 4D, a noble-metal layer 93 that eventually becomes the near-field light generator 7 and the first and second heat dissipation layers 7a, 7f, and 7f' is formed in the removed region by plating, the metal resist 92 is removed by CMP, and the noble-metal layer 93 and the SiO$_2$ layer 91 are planarized.

Figure 4E:
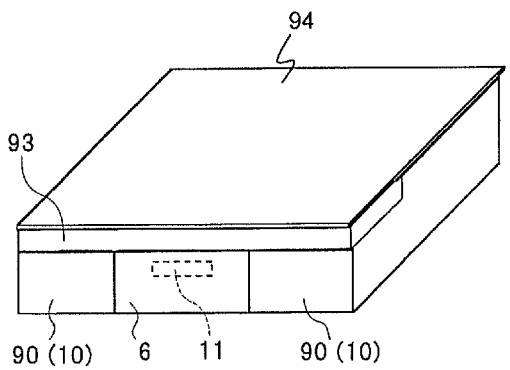
Figure 4F:
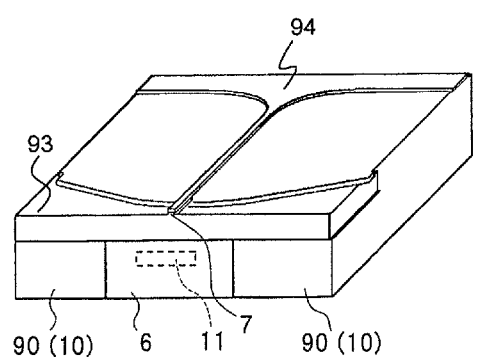
Figure 4G:
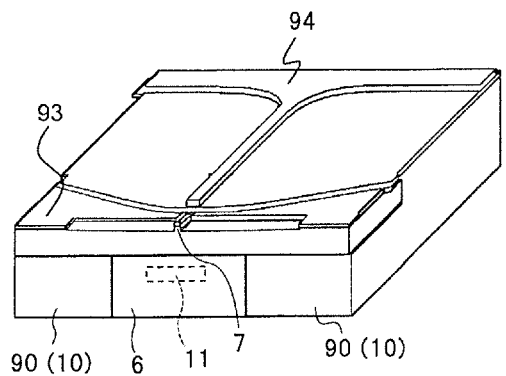
Figure 4H:
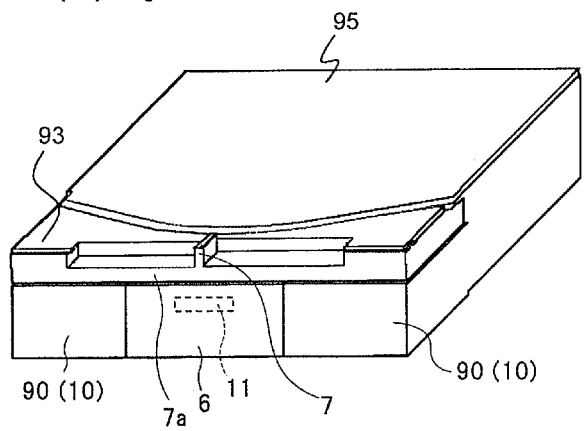
Figure 4I:
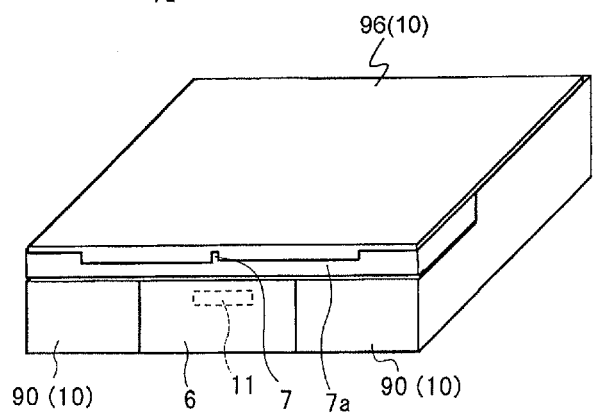

Next, as illustrated in FIG. 4E, a metal resist 94 is formed. Next, as illustrated in FIG. 4F, the surface of the noble-metal layer 93 is partially removed. At this time, a part of the noble-metal layer 93 that remains without getting removed because of the patterning beforehand of the metal resist 94 eventually becomes the near-field light generator 7. As illustrated in FIG. 4G, a metal resist is formed again and is patterned. As illustrated in FIG. 4H, a portion of the noble-metal layer 93 is removed along the ABS by reactive ion etching (RIE), and the first heat dissipation layer 7a of the near-field light generator 7 is formed. At this time, it is also possible to form simultaneously the second heat dissipation layers 7f and 7f' (not illustrated). As illustrated in FIG. 4I, the metal resist 95 is dissolved and removed by lift off, and a SiO$_2$ layer 96 that eventually becomes a portion of the insulating layer 10 is formed by sputtering.

Figure 4J:
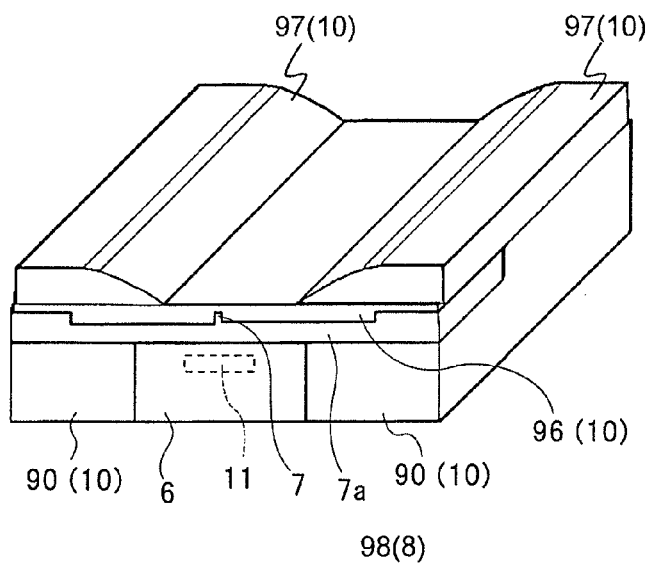
Figure 4K:
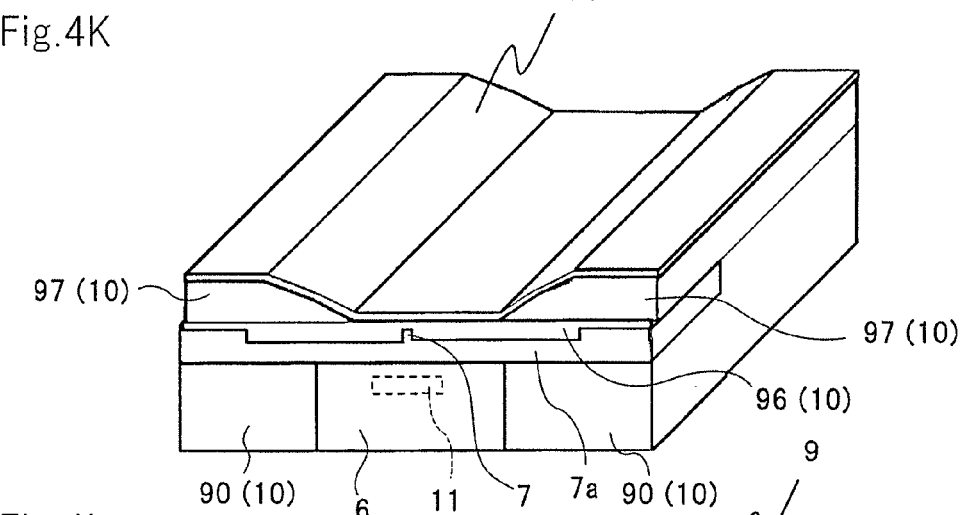
Figure 4L:
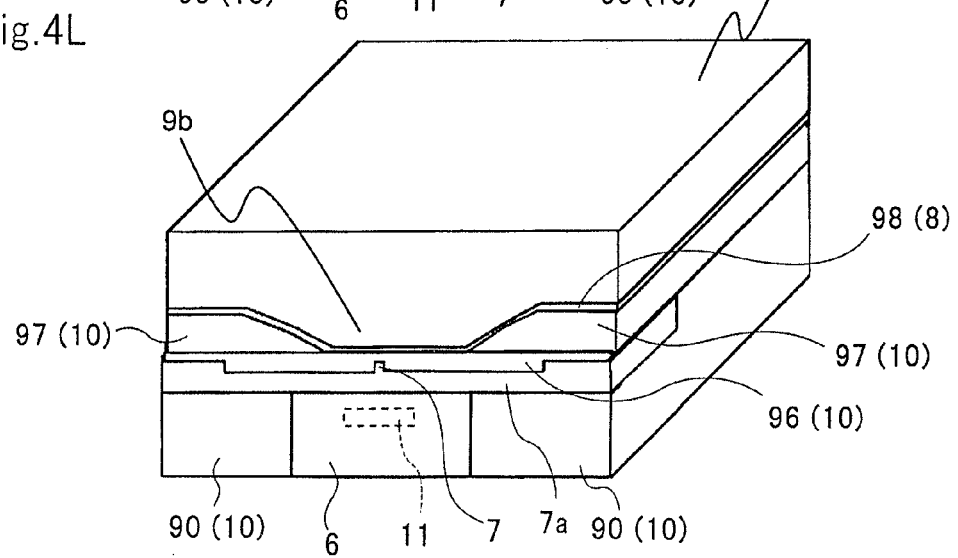
Figure 4M:
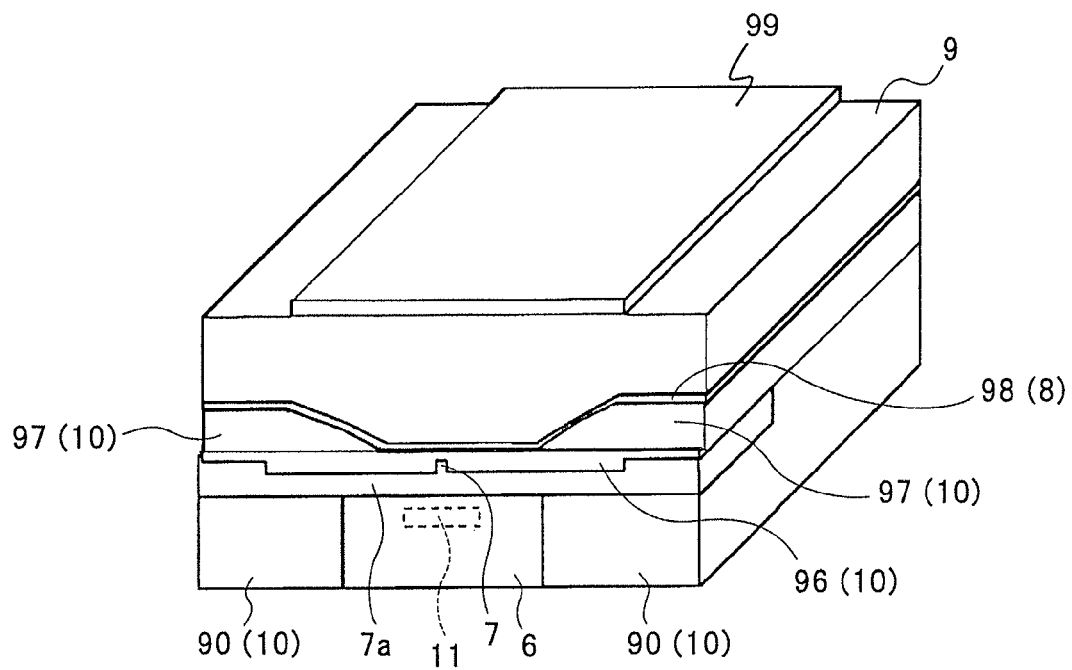
Figure 4N:
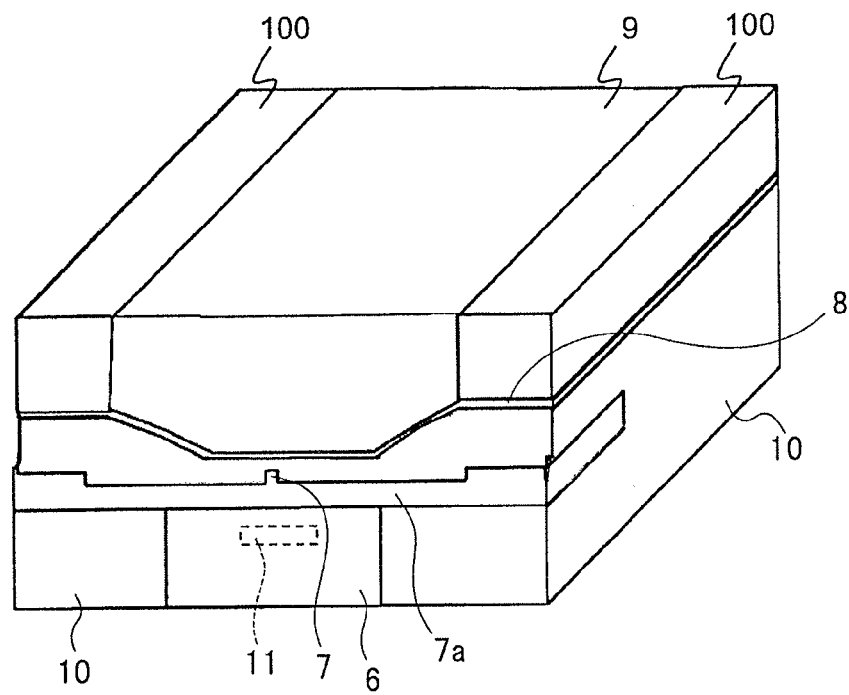

Next, as illustrated in FIG. 4J, SiO$_2$ layers 97 that eventually become portions of the insulating layer 10 are formed on both sides of the near-field light generator 7 by sputtering. Specifically, above the SiO$_2$ layer 96, a SiO$_2$ layer is formed by sputtering and a resist is coated. The resist above the near-field light generator 7 is removed, and the SiO$_2$ layer formed above the SiO$_2$ layer 96 is removed by milling. Next, as illustrated in FIG. 4K, a noble-metal layer 98 that eventually becomes the metal waveguide 8 is formed on the SiO$_2$ layers 97 by sputtering. As illustrated in FIG. 4L, the magnetic pole 9 is formed on the noble-metal layer 98 by sputtering. The magnetic pole 9 that is formed in a valley part between two of the SiO$_2$ layers 97 forms the projection part 9b. As illustrated in FIG. 4M, a portion above the near-field light generator 7 is covered by a resist 99, and potions of the magnetic pole 9 on the lateral sides of the resist 99 are removed. As illustrated in FIG. 4N, the removed portions are backfilled with noble metals 100 that connect the noble-metal layer 98, and the resist 99 is removed by CMP. In FIG. 4N, SiO$_2$ layers formed separately at each step are illustrated in a state where the SiO$_2$ layers are integrated to each other to be the insulating layer 10.

Another Embodiment

Figure 5A:
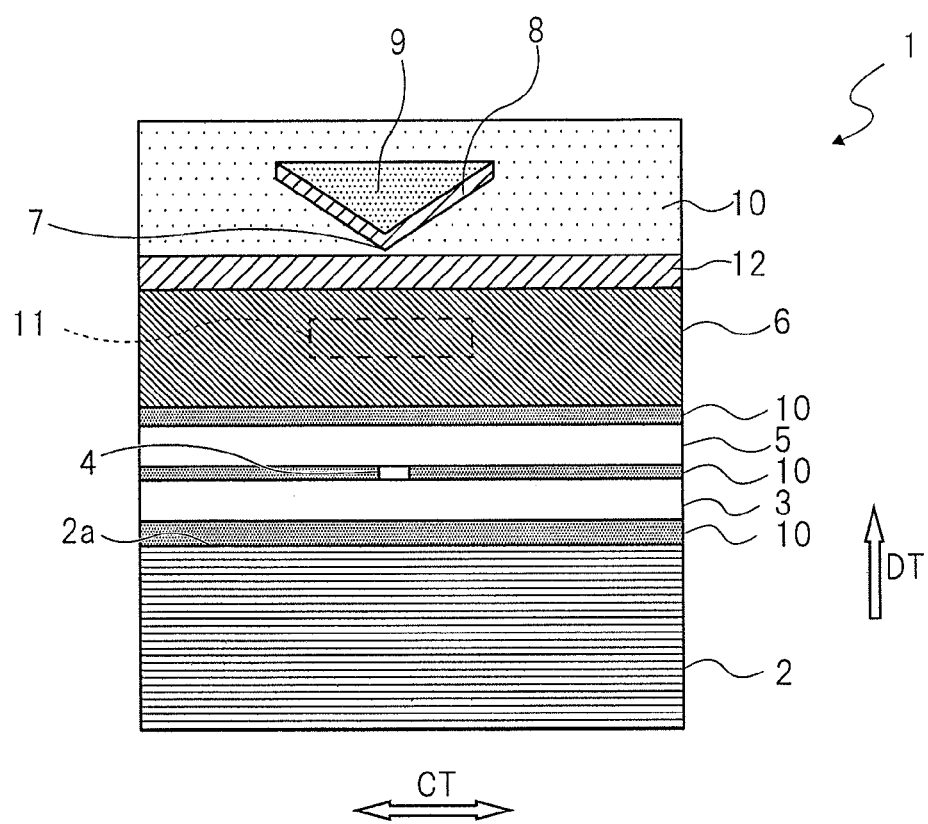
FIG. 5A is a view illustrating an air bearing surface of a thermal assisted magnetic recording head according to another embodiment of the present invention.
Figure 5B:
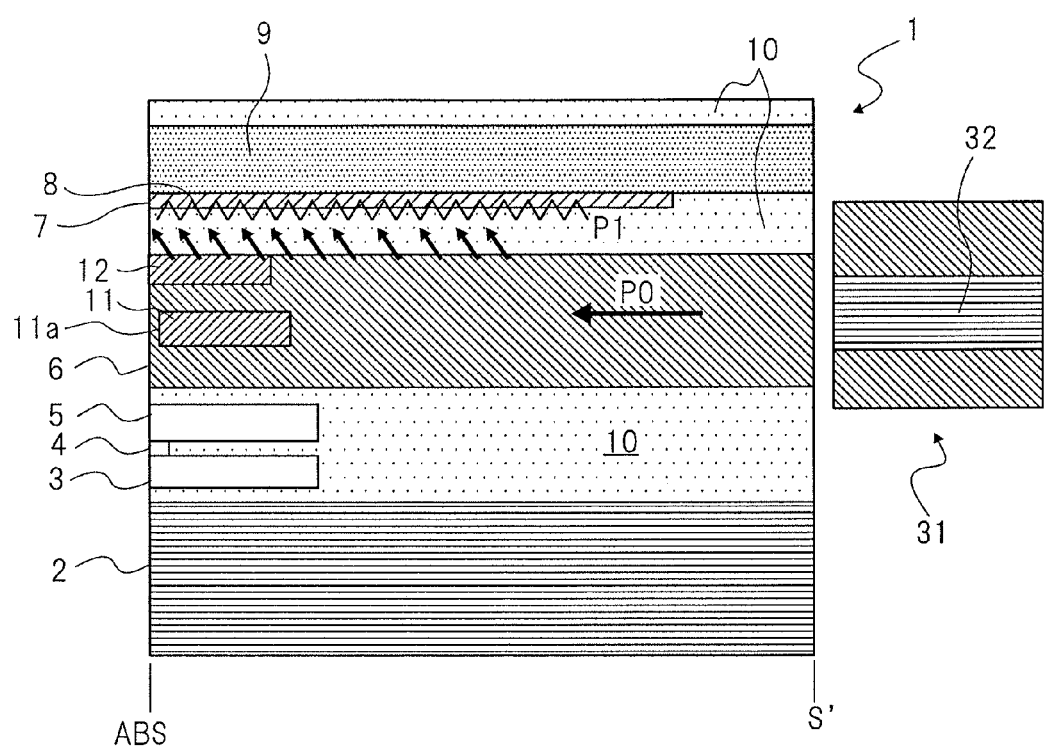
FIG. 5B is a cross sectional view of the thermal assisted magnetic recording head illustrated in FIG. 5A, the cross section cut along a direction orthogonal to the air bearing surface and a principle plane of a substrate.

FIGS. 5A and 5B illustrate a magnetic head 1 according to another embodiment of the present invention. In the magnetic head 1 illustrated in FIGS. 5A and 5B, a near-field light generator 7 is provided at an end part of a metal waveguide 8 on an ABS side. In other words, near-field light is generated on the ABS directly from surface plasmon P1 that propagates on the metal waveguide 8. From the perspective of the ABS, the metal waveguide 8 including the near-field light generator 7 has a V-shape protruding toward a dielectric waveguide 6 side (lower side of FIG. 5A), and the magnetic pole 9 has an inverse triangular shape along the V-shape of the metal waveguide 8.

Also, as illustrated in FIGS. 5A and 5B, a shield layer 12 is provided between the dielectric waveguide 6 and an insulating layer 10. The shield layer 12 is formed of a metal mainly made of gold, silver, copper, aluminum, or platinum, or an alloy of these as with the near-field light generator 7; however, because a part that corresponds to the frame part 7b does not exist, focused (high light density) surface plasmon is not generated. Then, the shield layer 12 prevents divergence of surface plasmon generated on the near-field light generator 7 and functions to prevent excessive heating of the temperature sensor 11. As one example, regarding the shield layer 12, the thickness in the lamination direction DT is 30-200 nm, the width in the track width direction CT is 1000-10000 nm, and the depth in the direction orthogonal to the lamination direction DT and the track width direction CT is 30-200 nm; regarding the temperature sensor 11, the thickness in the direction DT is 20-150 nm, the depth in the direction orthogonal to the direction DT and the direction CT is 50-500 nm, and the width in the direction CT is a size required to connect to a not-illustrated bump for detection of current and resistance.

Because the present embodiment has a configuration for performing one-stage transmission without performing the two-stage transmission of light energy as the above-described embodiment, the structure is simple. Even in such a configuration, it is effective to provide the temperature sensor 11 inside the dielectric waveguide 6. Then, when the end part 11a of the temperature sensor 11 on the ABS side is at the position recessed from the ABS and the temperature sensor 11 is surrounded by the dielectric waveguide 6 without contacting or approaching too much to the near-field light generator 7, particular effective effect is obtained.

(Magnetic Head Slider)

Next, descriptions is given of a magnetic head slider in which the above-described magnetic head 1 is integrated, a head gimbal assembly, and a hard disk device.

Figure 6:
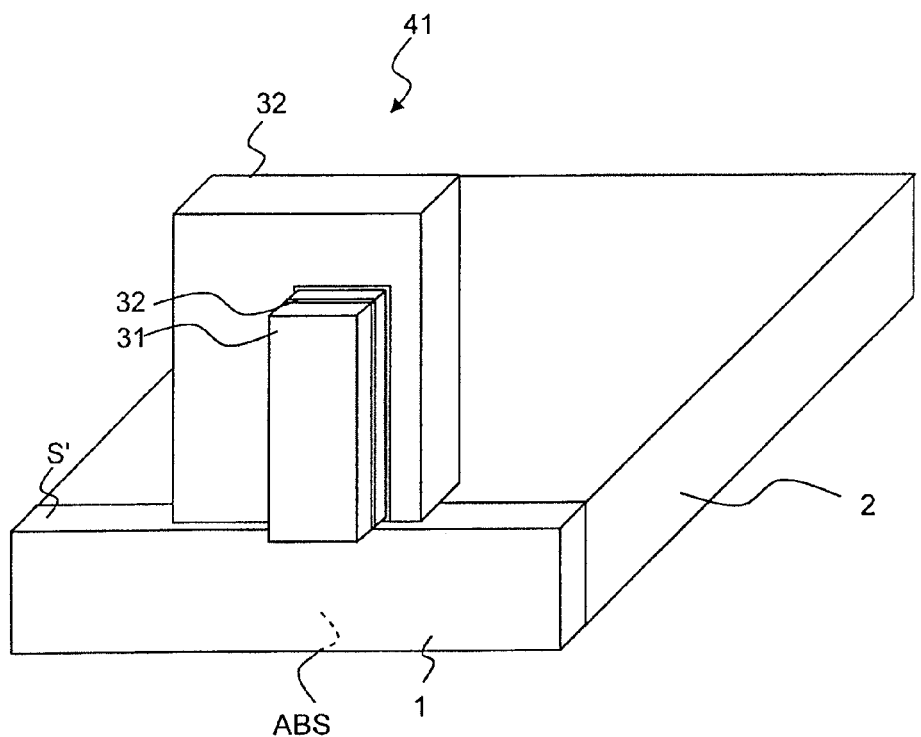
FIG. 6 is a perspective view of a magnetic head slider of the present invention.

FIG. 6 is an external appearance perspective view of the magnetic head slider. A magnetic head slider 41 has the magnetic head 1 and a laser diode 31 that is firmly attached to the magnetic head 1 and that emits laser light. The magnetic head 1 has a substantially hexahedral shape, and one surface of the six outer surfaces is the ABS that faces a magnetic recording medium M. The laser diode 31 is positioned on the surface S' on the opposite side of the ABS of the magnetic head 1. An active layer 32 in which laser light continuously oscillates faces the surface S' of the dielectric waveguide 6 of the magnetic head 1. The laser diode 31 is provided on the substrate 32, and is firmly attached to the magnetic head 1 by an adhering layer (not illustrated).

Figure 7:
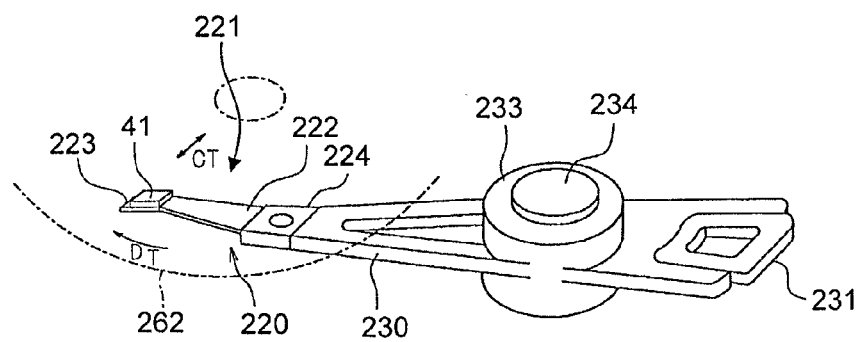
FIG. 7 is a perspective view of a head gimbal assembly of the present invention.

Referring to FIG. 7, a head gimbal assembly 220 includes the magnetic head slider 41 and a suspension 221 elastically supporting the magnetic head slider 41. The suspension 221 includes a load beam 222, a flexure 223 and a base plate 224. The load beam 222 is formed of stainless steel in a plate spring shape. The flexure 223 is arranged in one end part of the load beam 222. The base plate 224 is arranged in the other end part of the load beam 222. The magnetic head slider 41 is joined to the flexure 223 to give the magnetic head slider 41 suitable flexibility. At the part of the flexure 223 to which the magnetic head slider 41 is attached, a gimbal part is provided to maintain the magnetic head slider 41 in an appropriate orientation.

An assembly in which the head gimbal assembly 220 is mounted to an arm 230 is referred to as a head arm assembly 221. The arm 230 moves the magnetic head slider 41 in the track crossing direction CT of a hard disk 262. One end of the arm 230 is attached to the base plate 224. To the other end of the arm 230, a coil 231 that forms one part of a voice coil motor is attached. A bearing part 233 is provided in the middle part of the arm 230. The arm 230 is rotatably supported by a shaft 234 attached to the bearing part 233. The arm 230 and the voice coil motor for driving the arm 230 configure an actuator.

Figure 8:
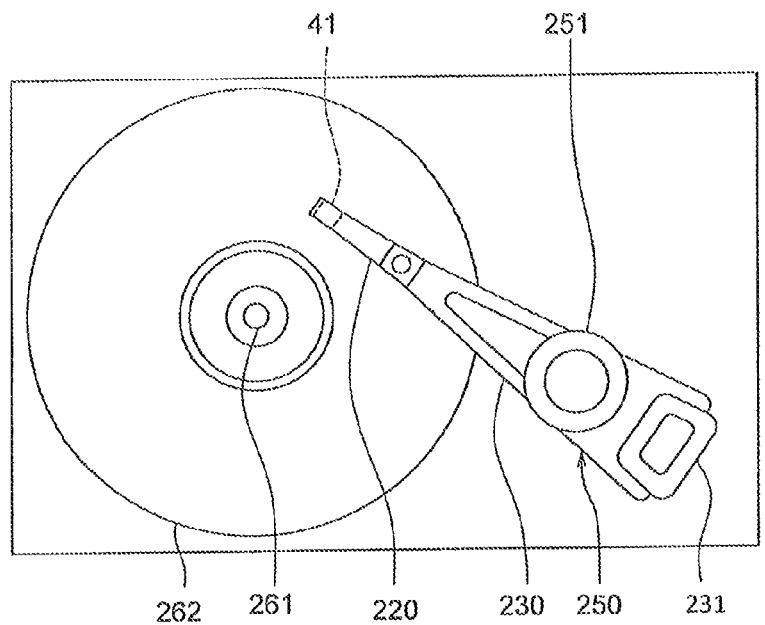
FIG. 8 is a plan view of a hard disk device of the present invention.

FIG. 8 is a plan view of the hard disk drive device. The hard disk drive device includes multiple hard disks (magnetic recording media) 262 attached to a spindle motor 261. For each of the hard disks 262, two magnetic head sliders 41 are arranged in a manner of sandwiching the hard disk 262 and facing each other. A head stack assembly 250 except for the magnetic head slider 41 and the actuator configure a positioning device, support the magnetic head slider 41, and position the magnetic head slider 41 with respect to the hard disk 262. The magnetic head slider 41 is moved in the track crossing direction CT of the hard disk 262 by the actuator, and is positioned with respect to the hard disk 262. The magnetic head 1 included in the magnetic head slider 41 records information to the hard disk 262 with the above-described magnetic pole 9 and the near-field light generator 7, and reproduces information recorded on the hard disk 262 with the MR element 4.

While preferred embodiments of the present invention have been shown and described in detail, and it is to be understood that variety of changes and modifications may be made without departing from the spirit of the following claims or its scope.

What is claimed is:

1. A thermal assisted magnetic recording head, comprising:
    a dielectric waveguide that is configured to propagate propagation light;
    a metal waveguide that is provided facing the dielectric waveguide and that couples to the propagation light propagating through the dielectric waveguide in a surface plasmon mode, thereby generating and propagating surface plasmon;
    a near-field light generator that is exposed on an air bearing surface facing a magnetic recording medium either at an end part of the metal waveguide or at a position facing the end part of the metal waveguide, and that generates near-field light from the surface plasmon;
    a magnetic pole for magnetic recording that is exposed on the air bearing surface; and
    a temperature sensor that is arranged inside the dielectric waveguide.

2. The thermal assisted magnetic recording head according to claim 1, wherein
    the temperature sensor is arranged at a position recessed from the air bearing surface in a direction orthogonal to the air bearing surface.

3. The thermal assisted magnetic recording head according to claim 2, wherein an end part of the temperature sensor on the air bearing surface side is covered by a dielectric body that configures the dielectric waveguide so as not to expose on the air bearing surface.

4. The thermal assisted magnetic recording head according to claim 3, wherein
the end part of the temperature sensor on the air bearing surface side is at a position recessed at a distance of 200 nm or less from the air bearing surface in the direction orthogonal to the air bearing surface.

5. The thermal assisted magnetic recording head according to claim 1, wherein
a gap between the temperature sensor and the near-field light generator along a lamination direction of the dielectric waveguide and the metal waveguide is 200 nm or less.

6. The thermal assisted magnetic recording head according to claim 1, wherein
the near-field light generator is provided at a position facing a part of the metal waveguide and extends to the air bearing surface, couples to the surface plasmon propagating on the metal waveguide in a surface plasmon mode, generates secondary surface plasmon with larger wavenumber than that of the surface plasmon propagating on the metal waveguide and propagates the secondary surface plasmon toward the air bearing surface, and generates near-field light at an end part of the air bearing surface.

7. The thermal assisted magnetic recording head according to claim 1, wherein
a shield layer is provided between the dielectric waveguide and the near-field light generator from the perspective of a lamination direction of the dielectric waveguide and the metal waveguide.

8. A magnetic head slider, comprising:
the thermal assisted magnetic recording head according to claim 1; and
a laser diode that is firmly attached to the magnetic head such that an active layer that oscillates laser light faces an end part of the dielectric waveguide of the magnetic head.

9. A head gimbal assembly, comprising:
the magnetic head slider according to claim 8; and
a suspension that includes a flexure joined to the magnetic head slider, a load beam having one end connected to the flexure, and a base plate connected to another end of the load beam, and that elastically supports the magnetic head slider.

10. A hard disk device, comprising:
the magnetic head slider according to claim 8;
the magnetic recording medium that faces the air bearing surface of the magnetic head slider;
a spindle motor that rotatably drives the magnetic recording medium; and
a device that supports the magnetic head slider and that positions the magnetic head slider with respect to the magnetic recording medium.

* * * * *